3,467,670
2-PHENYL-3-AMIDO-5,6-DIMETHOXYINDOLES
John T. Suh, Mequon, Wis., assignor to McNeil Laboratories, Incorporated, a corporation of Pennsylvania
No Drawing. Original application Oct. 5, 1964, Ser. No. 401,712, now Patent No. 3,370,063, dated Feb. 20, 1968. Divided and this application Apr. 28, 1967, Ser. No. 634,491
Int. Cl. C07d 27/56
U.S. Cl. 260—326.14    4 Claims

ABSTRACT OF THE DISCLOSURE

The compounds are of the class of 2-phenyl(or cycloalkyl)-3-amido-5,6-dimethoxyindoles, useful as ultraviolet light absorbers.

---

This application is a division of my co-pending application Ser. No. 401,712, filed Oct. 5, 1964, now U.S. Patent No. 3,370,063.

This invention relates to a new series of compounds and a novel method of making them. More particularly, it concerns certain 5,6-dimethoxyindoles which may be represented as follows:

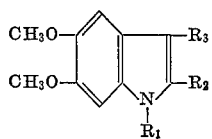

In the above formula $R_1$ stands for hydrogen, loweralkylcarbonyl, cyano-loweralkyl or loweralkyl-carbonylaminoloweralkyl; $R_2$ stands for aryl such as phenyl or naphthyl, substituted phenyl such as halophenyl, alkylphenyl, cyanophenyl, carboxyphenyl, aminophenyl, loweralkylaminophenyl, di-loweralkylaminophenyl, halomethylphenyl, loweralkylamino, amino-loweralkyl and loweralkyl-carbonylamino-loweralkyloxyphenyl or cyclohexyl or heterocyclic aryl groups comprising five-to-ten-membered heteroaromatics wherein the hetero atoms are one or more of thia, aza or oxa atoms, including monocyclic heteroaryls comprising five-to-six-members having at least one sulfur, nitrogen or oxygen atom as the heteroatom, and bicyclic heteroalkyls having up to ten members and having, as one of the cyclic moieties, a five-to-six-membered heteroaromatic ring with at least one sulfur, nitrogen or oxygen atom, and including specifically pyridyl, piperidyl, quinolyl, imidazolyl, pyrazinyl, pyrrolyl, thienyl, furyl, thiazolyl, thiadiazolyl, pyrazolyl, oxazolyl, pyrimidinyl, and N-alkylated derivatives thereof; and $R_3$ represents cyano, aminoalkyl or loweralkyl-carbonylamino-loweralkyl. Acid addition salts, such as the hydrochloride, fumarate, maleate and hexamate and loweralkyl quaternary ammonium derivatives of those substituted indoles containing a basic nitrogen in the $R_2$ or $R_3$ position are also included in the invention.

Compounds of the structure represented by the formula are prepared by condensing 4,5-dimethoxy-2-nitrophenyl acetonitrile with an aldehyde selected from the group consisting of phenyl, halophenyl, loweralkoxyphenyl, cyclohexyl, aminophenyl, loweralkylaminophenyl, di-loweralkylaminophenyl, loweralkylamino-loweralkyloxyphenyl, pyridyl, and N-loweralkyl piperidyl aldehydes in the presence of a catalytic amount of piperidine and subsequently reductively cyclizing the resulting β-substituted-α-(4,5-dimethoxy-2-nitrophenyl) acrylonitrile.

For the reductive cyclization of the β-substituted-α-(4,5-dimethoxy-2-nitrophenyl) acrylonitriles, a catalytic or chemical procedure that produces an intermediate stage of reduction and subsequently gives rise to cyclization to produce the corresponding indole may be employed. For example, under proper conditions catalysts such as iron, nickel, zinc, and tin and acids such as acetic, propionic, and hydrochloric may be employed. In the same manner and under proper conditions, hydrogen and palladium may be employed.

The reductive cyclization of the β - substituted - α - (4, 5 - dimethoxy - 2 - nitrophenyl) acrylonitriles is desirably achieved by adding iron powder to a refluxing solution of the nitrile in a glacial acetic acid and allowing the reaction mixture to reflux for 2 to 5 hours. The solvent is distilled under diminished pressure and the crude product is purified by recrystallization. The elemental analyses as well as ultra violet absorption, infrared absorption and nuclear magnetic resonance spectra support the assignment of the indole structures described herein.

3-N-acylamidoloweralkyl derivatives of the 3-cyano-2-substituted-5,6-dimethoxyindoles of this invention may be prepared by hydrogenating the cyanoindole in the presence of an acylating agent such as acetic anhydride over a nickel catalyst in the presence of a basic cocatalyst. Any other suitable method for reducing the cyano group and acylating may be employed.

As used herein, pyridyl represents 2-pyridyl, 3-pyridyl or 4-pyridyl. In the same manner, N-loweralkylpiperidyl represents 2-N-loweralkylpiperidyl, 3-N-loweralkylpiperidyl and 4-N-loweralkylpiperidyl.

As used herein, loweralkyl may be straight or branch chained and have from 1 to 4 carbon atoms, such as, for example, methyl, ethyl, propyl, isopropyl, butyl, isobutyl, tertiary butyl and the like.

The compounds of this invention absorb ultra violet light and are useful as sun-screening materials in salves and ointments. In addition, because of their solubility in organic materials generally, they may be used as ultra violet absorbers in plastics and resins, such as polystyrene, polyethylene, polypropylene, polyacrylics (methacrylate resins, polyacylamides, polyacrylonitrile fibers), polyamide fibers (nylon e.g.) and polyester fibers. In the latter use, the inclusion of 0.01 to 5 percent of the absorber, based on the polymer weight, is sufficient to render protection against ultra violet light, such as in plastic film or light filters. The absorber may be incorporated in the mixtures of monomers before polymerization to form the polymer or it may be incorporated in the polymer at any stage during its handling, as by milling into the polymer together with other compounding ingredients or during the spinning of polymers into fibers, etc.

The following examples are intended to illustrate, but not to limit, the scope of the invention.

EXAMPLE I

A solution of 6.59 grams of 4,5-dimethoxy-2-nitrophenyl acetonitrile and 4.1 grams of 4-pyridine carboxaldehyde in 250 ml. of boiling absolute alcohol is treated with 3.13 ml. of piperidine. The solution is boiled for 2½ hours and allowed to stand at room temperature for 2 days. A yellow precipitate is obtained. The mixture is filtered and the precipitate collected to yield α-(4,5-dimethoxy-2-nitrophenyl) - β - (4-pyridyl)acrylonitrile. Melting point 201° C.

EXAMPLE II

A solution of 6 grams of α-(4,5-dimethoxy-2-nitrophenyl)-β-(4-pyridyl)acrylonitrile in about 80 ml. of glacial acetic acid is heated on a steam bath with 3.38 grams of iron powder under continuous stirring for several hours. The mixture is then filtered. The residue from filtration is mixed with water and filtered again. The aqueous filtrate is then made basic by the addition of potassium bicarbonate. The yellow precipitate is 3-cyano-5,6-dimethoxy-2(4-pyridyl)indole. Melting point above 310° C.

EXAMPLE III

To a mixture of 3 grams of 3-cyano-5,6-dimethoxy-2 (4-pyridyl)indole in approximately 150 ml. of chloroform is added 4.14 grams of methyl iodide. The mixture is refluxed for about 3 hours. The reaction is stirred overnight for about 16 hours. The mixture is then distilled under reduced pressure to about ⅓ the volume and filtered to yield 4 - (3-cyano-5,6-dimethoxy-2-indolyl)-1-methylpyridinium iodide. Melting point, 282–283° C.

EXAMPLE IV

A 5.0 gram quantity of 3-cyano-5,6-dimethoxy-2(4-pyridyl)indole is hydrogenated at room temperature in 200 ml. acetic anhydride containing 20 grams sodium acetate (anhydrous) using Raney nickel as the catalyst. Removal of the catalyst yields a filtrate which is evaporated under reduced pressure to remove most of the solvent, leaving a thick oil. The oil is treated with ice water and made basic with the addition of 10 percent sodium hydroxide solution to give a white solid. The solid is recrystallized from methanol and water to give the white crystalline product 3-acetamidomethyl - 2 - (1-acetyl-4-piperidyl)-5,6-dimethoxyindole. Melting point, 157–158° C.

EXAMPLE V

To a refluxing solution of 22.5 grams of 4,5-dimethoxy-2-nitrophenyl acetonitrile in 400 ml. of absolute ethanol is added in portions a solution of 11 grams 3-pyridine carboxaldehyde in 50 ml. of absolute ethanol, and 8 ml. of piperidine. The resulting solution is allowed to reflux for 2½ hours and cooled. The bright yellow product α-(4,5-dimethoxy-2-nitrophenyl)-β-(3 - pyridyl)acrylonitrile crystallizes from the solution. Melting point, 204° C.

EXAMPLE VI

A mixture of 5 grams of α-(4,5-dimethoxy-2-nitrophenyl)-β-(3-pyridyl)acrylonitrile and 10 percent palladium on carbon in a mixture of ethyl acetate and ethanol is shaken with hydrogen for 1 hour. The catalyst is filtered off and the filtrate is distilled in vacuo to remove the solvent. The product is α-(2-amino - 4,5 - dimethoxyphenyl)-β-(3-pyridyl)acrylonitrile. Melting point, 130° C.

EXAMPLE VII

A solution of 12 grams of α-(4,5-dimethoxy-2-nitrophenyl)-β-(3-pyridyl)acrylonitrile in approximately 90 ml. of glacial acetic acid is heated on a steam bath with 6.76 grams of iron powder under continuous stirring for several hours. The mixture is filtered and the residue is mixed with water and filtered again. Both the acetic acid filtrate and the aqueous filtrate are made basic by the addition of potassium bicarbonate. The product obtained is 3-cyano-5,6-dimethoxy-2-(3-pyridyl)indole. Melting point, 238–239° C.

EXAMPLE VIII

A solution of 5.5 grams of 3-cyano-5,6-dimethoxy-2-(3-pyridyl)indole and 5.5 grams of methyl iodide in 150 ml. of dimethoxyethane is allowed to reflux for 4 hours. As the reaction proceeds, the solid product precipitates out from the solution. The reaction mixture is cooled and filtered to give 3-(3-cyano-5,6-dimethoxy-2-indolyl)-1-methylpyridinium iodide. Melting point, 300–301° C.

EXAMPLE IX

To a solution of 10 grams of α-(4,5-dimethoxy-2-nitrophenyl)-β-(4-pyridyl) acrylonitrile in approximately 275 ml. of chloroform is added 12.4 grams of methyl iodide with continuous stirring. The reaction is refluxed for approximately 1 hour and is allowed to continue stirring for approximately 21 hours. The reaction mixture is filtered to yield a precipitate which is recrystallized from methanol to give crystals of 4-(β-cyano-4,5-dimethoxy-2-nitrostyryl)-1-methylpyridinium iodide. Melting point, 216–217° C.

EXAMPLE X

A 10 gram sample of α-(4,5-dimethoxy-2-nitrophenyl)-β-(3-pyridyl) acrylonitrile is added to 300 ml. of 1,2-dimethoxyethane containing 9.1 grams of methyl iodide. The reaction mixture is refluxed with stirring for 1 hour and filtered to give an orange precipitate of 3-(β-cyano-4,5-dimethoxy-2-nitrostyryl) - 1 - methylpyridinium iodide which is recrystallized from methanol to yield yellow needles. Melting point, 206–207° C.

U.V. absorption in methanol: 219 mμ (ε29,500); 255 mμ (ε18,200); 270 mμ (ε16,400); 297 mμ (ε12,700).

EXAMPLE XI

To a mixture of 3 grams of 4-(β-cyano-4,5-dimethoxy-2-nitrostyryl)-1-methylpyridinium iodide in 100 ml. of methanol is added in portions 1.1 gram of sodium borohydride and the reaction mixture is allowed to stand at room temperature for 1 hour while stirring. During this period the color of the reaction mixture changes slowly from dark brown to light brown. The methanol solution is distilled in vacuo and 150 ml. of ice water is added to the residue. The water insoluble residue α-(4,5-dimethoxy - 2 - nitrophenyl) - β - (1,2,3,6 - tetrahydro - 1-methyl-4-pyridyl) acrylonitrile is isolated by filtration and dried in air at room temperature. Melting point, 136° C.

EXAMPLE XII

To a warm solution of 30 grams of 4,5-dimethoxy-2-nitrophenylacetonitrile in 300 ml. of ethanol, 25 grams of p-diethylaminobenzaldehyde is added. The solution is treated with 9.45 ml. of piperidine and allowed to reflux for 6 hours. The reaction mixture is cooled and filtered to yield a bright orange precipitate. The precipitate is recrystallized from methanol to give fluffy orange plates of α - (4,5 - dimethoxy-2-nitrophenyl)-β-(4-diethylaminophenyl)acrylonitrile. Melting point, 123–124° C.

EXAMPLE XIII

To refluxing solution of 10 grams of α-(4,5-dimethoxy-2 - nitrophenyl) - β - (4 - diethylaminophenyl)acrylonitrile in 250 ml. of glacial acetic acid is added in portions 2.94 grams of iron powder. The resulting reaction mixture is allowed to reflux for 2½ hours and is then filtered. The filtrate is distilled under diminished pressure. The residue is treated with 150 ml. of water, filtered and the residue and filtrate (from filtration) are treated with 100 ml. of methanol and 10 percent sodium hydroxide solution. The solid product is filtered and recrystallized from hot boiling methanol with the addition of water to yield 3 - cyano-5,6-dimethoxy-2-(p-diethylaminophenyl)indole. The hydrochloric acid addition salt is prepared by reacting 3 - cyano-5,6-dimethoxy-2-(p-diethylaminophenyl)indole with hydrogen chloride in ether. In a similar manner other acid addition salts such as the fumarate, maleate and hexamate salts are prepared by using the corresponding acid in ether solution.

EXAMPLE XIV

A mixture of 6 grams of sodium acetate, 7.6 grams of 3 - cyano - 5,6-dimethoxy-2-(p-diethylaminophenyl)indole and two teaspoonfuls of nickel catalyst in 150 ml. of acetic anhydride is shaken with hydrogen at room temperature for 24 hours. After the theoretical amount of hydrogen has been taken up, the mixture is filtered. The acetic anhydride is hydrolyzed with ice water and the acid solution is partially neutralized with 30 grams of sodium hydroxide in 100 ml. of water. The white product formed is 3-acetamido methyl-2-(p-diethylaminophenyl)-5,6-dimethoxyindole. Melting point, 194° C.

EXAMPLE XV

A solution of 30 grams of 4,5-dimethoxy-2-nitrophenyl acetonitrile, 23 grams of p-dimethylaminobenzaldehyde and 10 ml. of piperidine in 400 ml. of methanol is allowed to reflux for 3½ hours. Upon cooling and filtering the mixture, α-(4,5-dimethoxy-2-nitrophenyl)-β-(p-dimethylaminophenyl)acrylonitrile is obtained. Melting point, 181° C.

EXAMPLE XVI

To a refluxing solution of 16 grams of α-(4,5-dimethoxy - 2 - nitrophenyl) - β - (p - dimethylaminophenyl) acrylonitrile in 200 ml. of acetic acid is added in portions 5.1 grams of iron powder and the reaction mixture is allowed to reflux for 6 hours. The reaction mixture is filtered and the residue is washed with methanol twice to yield 3 - cyano - 5,6 - dimethoxy-2-(p-dimethylaminophenyl)indole. Melting point, 265–266° C.

EXAMPLE XVII

A mixture of 7.9 grams of 3-cyano-5,6-dimethoxy-2-(p-dimethylaminophenyl)indole, 2½ teaspoonfuls of nickel catalyst, 10 grams of sodium acetate and 185 ml. of acetic anhydride is shaken up with hydrogen at room temperature for 20 hours. The mixture is filtered and the filtrate is distilled in vacuo. The white crystalline solid is treated with ice water and is allowed to stand at room temperature overnight. The product is filtered and recrystallized from benzene-ethanol to give 3-acetamidomethyl-2-(p-dimethylaminophenyl)-5,6-dimethoxyindole. Melting point, 240–241° C.

EXAMPLE XVIII

To a warm solution of 22 grams of 4,5-dimethoxy-2-nitrophenylacetonitrile in 400 ml. of absolute ethanol is added 11 grams of pyridine-2-carboxaldehyde in 50 ml. of absolute alcohol and 8 ml. of piperidine. The reaction mixture is refluxed for 2 hours and is thereafter cooled and filtered to give α-(4,5-dimethoxy-2-nitrophenyl)-β-(2-pyridyl) acrylonitrile. Recrystallization from ethyl acetate gives pure material. Melting point, 187–189° C.

EXAMPLE XIX

To a refluxing solution of 30 grams of 4,5-dimethoxy-2-nitrophenylacetonitrile in 250 ml. of absolute methanol is added 33 grams of p-2-diethylaminoethoxybenzaldehyde and 10 ml. of piperidine. The resulting mixture is refluxed for 6 hours, cooled, filtered to yield a solid which is recrystallized from methanol to obtain β-[p-(2-diethylaminoethoxy) phenyl] - α - (4,5-dimethoxy-2-nitrophenyl) acrylonitrile. Melting point, 105° C.

U.V. absorption in methanol: 230 mμ (ε18,800); 311 mμ (ε28,700).

EXAMPLE XX

To a refluxing solution of 20.5 grams of β-[p-(2-diethylaminoethoxy) phenyl] - α - (4,5 - dimethoxy-2-nitrophenyl)acrylonitrile in 200 ml. of acetic acid is added in portions, 5.6 grams of iron powder. The reaction mixture is refluxed for 4 hours. The mixture is filtered and the filtrate is distilled in vacuo. The residue is treated with 20.0 ml. of water and 30 percent sodium hydroxide to make the solution basic, and filtered. The product obtained is 3-cyano-2-[p-(2-diethylaminoethoxy) phenyl]-5,6-dimethoxyindole which is recrystallized several times from dilute methanol. Melting point, 165° C.

EXAMPLE XXI

A solution of 15 grams of 4,5-dimethoxy-2-nitrophenylacetonitrile and 15 grams of pyrrole-2-carboxyaldehyde in about 250 ml. of absolute ethanol is treated with 7.23 ml. of piperidine under refluxing. The refluxing is continued for 1 hour. The mixture is filtered to yield a solid which is recrystallized from methanol-ethanol to give α-(4,5-dimethoxy-2-nitrophenyl)-β-(2-pyrrolyl)acrylonitrile, red crystals. Melting point, 193–194° C.

U.V. absorption in methanol: 218 mμ (ε16,600); 247 mμ (ε11,100); 337 mμ (ε24,400).

EXAMPLE XXII

A solution of 15 grams of 4,5-dimethoxy-2-nitrophenylacetonitrile and 9.5 grams of N-methylpyrrole-2-carboxaldehyde in about 250 ml. of absolute ethanol is treated with 7.23 ml. of piperidine and refluxed for approximately 4 hours. The mixture is filtered to yield an orange precipitate of α-(2-nitro - 4,5 - dimethoxyphenyl) - β - (1-methyl-2-pyrrolyl) acrylonitrile. Melting point, 182–183° C.

EXAMPLE XXIII

A solution of 4.68 grams of 4,5-dimethoxy-2-nitrophenylacetonitrile and 3.04 grams of 2-thiophenecarboxaldehyde in approximately 79 ml. of absolute ethanol is treated with 2.25 ml. of piperidine and refluxed about 1 hour. The reaction is cooled and filtered to give a solid which is crystallized from methanol to give α-(4,5-dimethoxy-2-nitrophenyl)-β-(2-thienyl) acrylonitrile. Melting point, 187–188° C.

EXAMPLE XXIV

To a hot solution of 20 grams of α-(4,5-dimethoxy-2-nitrophenyl)-β-(2-thienyl) acrylonitrile in 125 ml. of glacial acetic acid, 7.06 grams of iron powder is added. The mixture is stirred under reflux for 2 hours and 15 minutes. The reaction mixture is then filtered to yield a solid which is recrystallized from methanol to give silvery white needles of 3-cyano-5,6-dimethoxy-2-(2-thienyl) indole. Melting point, 209–210° C.

EXAMPLE XXV

To a warm solution of 30 grams of 4,5-dimethoxy-2-nitrophenylacetonitrile in 300 ml. of absolute ethanol, 15 grams of furfural and 9.45 grams of piperidine (catalyst) are added. The reaction solution is refluxed for 1½ hours, cooled and filtered to yield α-(2-nitro-4,5-dimethoxyphenyl)-β-(2-furyl) acrylonitrile. Melting point, 181–182° C.

U.V. absorption in methanol: 213 mμ (ε12,200); 244 mμ (ε12,900); 316 mμ (ε25,600).

EXAMPLE XXVI

A solution of 17.7 grams of α-(2-nitro-4,5-dimethoxyphenyl)-β-(2-furyl) acrylonitrile in 300 ml. of glacial acetic acid is stirred with 6.57 grams of iron powder under refluxing for about 2½ hours. The reaction is allowed to cool and is filtered. Evaporation of the filtrate leaves a gum which crystallizes upon treatment with water. Recrystallization of the solid from aqueous ethanol gives 3-cyano-2-(2-furyl) - 5,6 - dimethoxyindole. Melting point, 180–181° C. U.V. absorption in methanol: 237 mμ (ε19,100); 336 mμ (ε29,400).

EXAMPLE XXVII

To a refluxing solution of 10 grams of 4,5-dimethoxy-2-nitrophenylacetonitrile in 200 ml. of methanol is added in portions 7 grams of cyclohexanecarboxyaldehyde and 3 ml. of piperidine. The mixture is allowed to reflux for 6 hours. The reaction mixture is cooled and the solid product precipitated is filtered and crystallized from methanol to give β-cyclohexyl-α-(4,5-dimethoxy-2-nitrophenyl)acrylonitrile. Melting point, 161° C.

U.V. absorption in methanol: 248 mμ (ε12,400); 295, 342 mμ.

EXAMPLE XXVIII

To a refluxing solution of 22.5 grams of β-cyclohexyl-α-(4,5-dimethoxy-2-nitrophenyl)acrylonitrile in 200 ml. of acetic acid is added in portions 8.4 grams of iron powder. The resulting mixture is refluxed for 6 hours. The reaction mixture is filtered and the filtrate is evaporated under diminished pressure to give a residue which is recrystallized from ethyl acetate-hexane to obtain 3-cyano-2-cyclohexyl-5,6-dimethoxyindole. Melting point, 137–139° C.

EXAMPLE XXIX

To a warm solution of 30 grams of 4,5-dimethoxy-2-nitrophenylacetonitrile in 300 ml. of absolute ethanol, 20 grams of 4-cyanobenzaldehyde and 9.45 ml. of piperidine are added. The reaction solution is refluxed for 3 hours. The reaction mixture is filtered to yield a bright yellow product which is crystallized from methanol to give α-(2-nitro-4,5-dimethoxyphenyl)-β-(4-cyanophenyl)acrylonitrile. Melting point, 214–215° C.

U.V. absorption in methanol: 246 mμ (ε14,200); 289 mμ (ε26,600).

EXAMPLE XXX

A solution of 5 grams of α-(2-nitro-4,5-dimethoxyphenyl)-β-(4-cyanophenyl)acrylonitrile in 175 ml. of acetic acid is stirred with 1.66 grams of iron powder under refluxing conditions for approximately 2 hours. The reaction mixture is cooled and filtered. The solid product is recrystallized from methanol to yield 3-cyano-5,6-dimethoxy-2-(4-cyanophenyl)indole. Melting point, 283° C.

U.V. absorption in methanol: 219 mμ (ε28,000); 242 mμ (ε16,300); 359 mμ (ε19,900).

EXAMPLE XXXI

To a refluxing solution of 21 grams of 4,5-dimethoxy-2-nitrophenylacetonitrile in 200 ml. of methanol is added in portions, 14 grams of p-chlorobenzaldehyde in 100 ml. of methanol and 5 ml. of piperidine. The mixture is refluxed for 4 hours. The reaction mixture is cooled and the solid product is filtered and recrystallized from methanol to give β-(p-chlorophenyl)-α-(4,5-dimethoxy - 2 - nitrophenyl) acrylonitrile. Melting point, 176.5–177° C.

U.V. absorption in methanol: 295 mμ (ε25,800); 223 mμ (ε18,700).

EXAMPLE XXXII

To a refluxing solution of 24 grams of β-(p-chlorophenyl)-α-(4,5-dimethoxy-2-nitrophenyl)acrylonitrile in 200 ml. of glacial acetic acid is added in portions 8 grams of iron powder. The reaction mixture is refluxed for 3 to 4 hours, cooled and then filtered. The residue is washed with hot methanol and boiling water and crystallized from methanol to give 3-cyano-2-(p-chlorophenyl)-5,6-dimethoxyindole. Melting point, 284–285° C.

U.V. absorption in methanol: 331 mμ (ε22,000); 236 mμ (ε24,800).

EXAMPLE XXXIII

A 3 gram quantity of 3-cyano-2-(p-chlorophenyl)-5,6-dimethoxyindole is treated with 75 ml. of acetic anhydride. Upon heating the sample gradually goes into solution. The reaction is refluxed for about 2 hours and allowed to cool to room temperature. The precipitated material, 1-acetyl-3-cyano-2-(p-chlorophenyl)-5,6-dimethoxyindole is recrystallized from benzene. Melting point, 266–267° C.

U.V. absorption in methanol: 218 mμ (ε10,800); 244 mμ (ε10,000); 327 mμ (ε11,600).

EXAMPLE XXXIV

A mixture of 3 teaspoons of Raney nickel catalyst, (previously washed with acetic anhydride), 10 grams of anhydrous sodium acetate, 5 grams of 2-(p-chlorophenyl)-3-cyano-5,6-dimethoxy-1-indolepropionitrile in 200 ml. of acetic anhydride, is shaken with hydrogen at room temperature for 4 hours. The reaction mixture is filtered to yield a dark filtrate which is evaporated under reduced pressure to yield a gum. Upon standing over the weekend, the gum crystallizes to a greenish precipitate. Ice is added and the mixture is filtered to yield a precipitate of 3-acetamidomethyl-1-acetamidopropyl-2-(p-chlorophenyl) - 5,6-dimethoxyindole. The material is recrystallized from aqueous methanol to yield yellow crystals. Melting point, 224–225° C.

EXAMPLE XXXV

A 15.0 gram quantity of 3-cyano-2-(p-chlorophenyl-5,6-dimethoxy-indole is dissolved in 380 ml. of dimethylformamide and filtered. The filtrate is then treated with 180 ml. of acrylonitrile and 6 ml. of 40 percent alcoholic benzyltrimethylammonium methoxide to which a few drops of water have been added. The solution is then heated on a steam bath for 3 hours and is then refrigerated for 2 days. The reaction mixture is filtered and washed with water. Recrystallization from dimethylformamide gives 2-(p-chlorophenyl)-3-cyano-5,6-dimethoxy - 1 - indolepropionitrile. Melting point, 262–264° C.

EXAMPLE XXXVI

A 6.66 gram quantity of 3-cyano-5,6-dimethoxy-2-(4-cyanophenyl)indole is refluxed for 29½ hours in a solution of 3.52 grams of sodium hydroxide in 50 ml. of water. To this is added 20 ml. of 95 percent ethanol. The reaction mixture is allowed to stand at room temperature for 62 hours. The reaction mixture is cooled and filtered to yield a solid, which is recrystallized from water to give sodium p - (3 - cyano - 5,6 - dimethoxyindol-2-yl)benzoate. Melting point, above 340° C. Acidification with dilute aqueous hydrochloric acid yields p-(3-cyano-5,6-dimethoxyindol - 2 - yl)benzoic acid. Melting point, above 340° C.

EXAMPLE XXXVII

Using the procedure of Example XXXI and replacing the p-chlorobenzaldehyde with an equivalent amount of benzaldehyde, the product recovered is β-phenyl-α-(4,5-dimethoxyl-2-nitrophenyl)acrylonitrile.

EXAMPLE XXXVIII

Using the procedure of Example XXXII and replacing the β - (p - chlorophenyl)-α-(4,5-dimethoxy-2-nitrophenyl) acrylonitrile with an equivalent amount of the β-phenyl-α-(4,5 - dimethoxy-2-nitrophenyl)acrylonitrile, the product recovered is 3-cyano-2-phenyl-5,6-dimethoxyindole. Melting point, 254–255° C.

U.V. absorption in methanol: 225 mμ (ε27,800); 330 mμ (ε28,800).

EXAMPLE XXXIX

Using the procedure of Example XXXI and replacing the p-chlorobenzaldehyde with an equivalent amount of p-methoxybenzaldehyde, the product recovered is β-(p-methoxyphenyl) - α - (4,5-dimethoxy-2-nitrophenyl)acrylonitrile. Melting point, 200–201° C. yellow plates.

U.V. absorption in methanol: 237 mμ (ε16,700); 319 mμ (ε24,000).

EXAMPLE XL

Using the procedure of Example XXXII and replacing the β-(p-chlorophenyl) - α - (4,5-dimethoxy-2-nitrophenyl) acrylonitrile with an equivalent amount of β-(p-methoxyphenyl)-α-(4,5-dimethoxy-2-nitrophenyl)acrylonitrile, the product recovered is 3-cyano-2-(p-methoxyphenyl)-5,6-dimethoxyindole. Melting point, 247–248° C. pink plates.

U.V. absorption in methanol: 238 mμ (ε22,800); 332 mμ (ε27,600).

EXAMPLE XLI

Using the procedure of Example XXXI and replacing the p-chlorobenzaldehyde with an equivalent amount of p-aminobenzaldehyde, the product recovered is β-(p-aminophenyl) - α - (4,5 - dimethoxy-2-nitrophenyl)acrylonitrile.

EXAMPLE XLII

Using the procedure of Example XXXII and replacing the β - (p - chlorophenyl)-α-(4,5-dimethoxy-2-nitrophenyl) acrylonitrile with an equivalent amount of β-(p-aminophenyl)-α-(4,5-dimethoxy-2-nitrophenyl)acrylonitrile, the product recovered is 3-cyano-2-(p-aminophenyl)-5,6-dimethoxyindole.

EXAMPLE XLIII

Using the procedure of Example XXXI and replacing the p-chlorobenzaldehyde with an equivalent amount of p-methylaminobenzaldehyde, the product recovered is β-(p-methylaminophenyl) - α - (4,5 - dimethoxy-2-nitrophenyl) acrylonitrile.

EXAMPLE XLIV

Using the procedure of Example XXXII and replacing the β - (p - chlorophenyl)-α-(4,5-dimethoxy-2-nitrophenyl) acrylonitrile with an equivalent amount of β-(p-methylaminophenyl) - α - (4,5 - dimethoxy-2-nitrophenyl)acrylonitrile, the product recovered is 3-cyano-2-(p-methylaminophenyl)-5,6-dimethoxyindole.

EXAMPLE XLV

Using the procedure of Example XXXI and replacing the p-chlorobenzaldehyde with an equivalent amount of p-trifluoromethylbenzaldehyde, the product recovered is β-(p-trifluoromethylphenyl)-α-(4,5-dimethoxy-2-nitrophenyl) acrylonitrile.

EXAMPLE XLVI

Using the procedure of Example XXXII and replacing the β-(p-chlorophenyl)-α-(4,5-dimethoxy-2-nitrophenyl) acrylonitrile with an equivalent amount of β-(p-trifluoromethylphenyl) - α - (4,5 - dimethoxy-2-nitrophenyl)acrylonitrile the product recovered is 3-cyano-2-(p-trifluoromethylphenyl)-5,6-dimethoxyindole.

I claim:
1. A member of the group consisting of 5,6-dimethoxyindoles having the formula

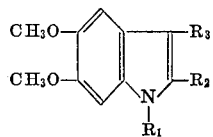

wherein $R_1$ is a member of the group consisting of loweralkylcarbonylamino-loweralkyl; $R_2$ is a member of the group consisting of chlorophenyl and di-loweralkylaminophenyl and $R_3$ is a member of the group consisting of loweralkylcarbonyl-aminoloweralkyl.

2. 3 - acetamidomethyl - 2 - (p - diethylaminophenyl)-5,6-dimethoxyindole.

3. 3 - acetamidomethyl - 2 - (p - dimethylaminophenyl)-5,6-dimethoxyindole.

4. 3 - acetamidomethyl - 1 - acetamidopropyl - 2 - (p-chlorophenyl)-5,6-dimethoxyindole.

References Cited
UNITED STATES PATENTS 3,104,241  9/1963  Enenkel et al. _____ 260—247.2

ALEX MAZEL, Primary Examiner

J. A. NARCAVAGE, Assistant Examiner